United States Patent
Jang et al.

(10) Patent No.: US 7,434,114 B2
(45) Date of Patent: Oct. 7, 2008

(54) METHOD OF COMPENSATING FOR A BYTE SKEW OF PCI EXPRESS AND PCI EXPRESS PHYSICAL LAYER RECEIVER FOR THE SAME

(75) Inventors: Soon-Bok Jang, Suwon-si (KR); Young-Gyu Kang, Hwaseong-si (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 223 days.

(21) Appl. No.: 11/326,622

(22) Filed: Jan. 7, 2006

(65) Prior Publication Data

US 2006/0156083 A1   Jul. 13, 2006

(30) Foreign Application Priority Data

Jan. 10, 2005   (KR)   ............... 10-2005-0001995

(51) Int. Cl.
 *G06K 5/04* (2006.01)
(52) U.S. Cl. ............. 714/700; 714/701; 714/707; 714/709; 714/712; 714/715; 714/724; 714/735; 714/744; 714/799; 714/25; 714/43; 714/56
(58) Field of Classification Search ............... None
 See application file for complete search history.

(56) References Cited

U.S. PATENT DOCUMENTS 7,174,412 B2 * 2/2007 Lin ................ 710/316
2004/0103333 A1 * 5/2004 Martwick et al. ........... 713/400
2005/0024926 A1 * 2/2005 Mitchell et al. ............. 365/154
2005/0141661 A1 * 6/2005 Renaud et al. .............. 375/372
2005/0144341 A1 * 6/2005 Schmidt et al. .............. 710/52
2005/0144342 A1 * 6/2005 Renaud et al. ............... 710/52
2005/0154946 A1 * 7/2005 Mitbander et al. .......... 714/724
2006/0209735 A1 * 9/2006 Evoy .......................... 370/315

FOREIGN PATENT DOCUMENTS

| JP | 11074945 | 3/1999 |
| JP | 11341102 | 12/1999 |
| JP | 20020044061 | 2/2002 |
| KR | 20030090954 | 12/2003 |

OTHER PUBLICATIONS

PCI-SIG, techsupp@pcisig.com, "PCI Express Base Specification Revision 1.0", Apr. 29, 2002, pp. 158-160.*

* cited by examiner

*Primary Examiner*—John P Trimmings
(74) *Attorney, Agent, or Firm*—F. Chau & Associates, LLC (57) ABSTRACT

A method of compensating for a byte skew of a PCI Express bus, the method including determining whether received data are in a training sequence or not, setting an alignment point corresponding to each of the lanes based on a comma symbol included in the training sequence when the received data are in the training sequence, and shifting the alignment point by reflecting an addition or a removal of a skip symbol on the received data through each of the four lanes when the received data are not in the training sequence. Therefore, the byte skew of the PCI Express bus may be effectively compensated for despite the addition or the removal of the skip symbol.

15 Claims, 9 Drawing Sheets

METHOD OF COMPENSATING FOR A BYTE SKEW OF PCI EXPRESS AND PCI EXPRESS PHYSICAL LAYER RECEIVER FOR THE SAME

CROSS REFERENCE TO RELATED APPLICATIONS

This application claims priority to Korean Patent Application No. 2005-1995 filed on Jan. 10, 2005 in the Korean Intellectual Property Office, the entire contents of which are incorporated herein by reference.

BACKGROUND OF THE INVENTION

1. Field of the Invention

The present invention relates to PCI (Peripheral Component Interconnect) Express, and more particularly to a method of compensating for a byte skew of PCI Express and a PCI Express physical layer receiver for the same.

2. Description of the Related Art

PCI Express was introduced in 2002 to overcome speed limitations of conventional PCI, so as to match the speed of current CPUs. The conventional PCI signals were easily distorted due to a parallel transmission interference. Accordingly, it is difficult to increase the clock frequency of a conventional PCI bus. A PCI Express bus, which employs a serial transmission manner, is capable of increasing the clock frequency and is capable of reducing a bus size.

PCI Express, formerly known as 3rd Generation I/O (3GIO), has replaced conventional PCI in a wide variety of fields. PCI Express features low-voltage differential signaling (LVDS), a packet-based data transmission protocol and so on. PCI Express supports a dual simplex type bus. The dual simplex bus includes a pair of one directional data buses, one bus is used for transmitting data and the other bus is used for receiving the data. Due to the LVDS, the PCI Express bus uses a 4-wire interface per lane. As a result, the PCI Express bus uses more wires per data bit than that of the conventional data bus. Also, a message-based protocol and an embedded clocking of the PCI Express bus may contribute to omitting usage of various data control signals required for an interface process of the conventional data bus. The PCI Express bus may include a maximum of 32 lanes. Generally, when a multi-lane bus, such as the PCI Express bus is used, a transmitter transmits divided data to each of the lanes so as to improve transmission efficiency. For example, when the number of the lanes is 4, the data to be transmitted to a receiver is divided to each of 32-bit data packets and the 32-bit data packets are divided to each of 8-bit data packets. Each of the 8-bit data packets is transmitted through each of the four lanes at the same time. The receiver aligns the received data through the wire by compensating for a bit skew between the received data using a comma symbol, and then, aligns the first aligned received data for which the bit skew is compensated, by compensating for a byte skew between the first aligned received data. The bit skew compensation deals with the skew within 8 bits between the received data through each of the lanes bit by bit. Because each of the lanes has a different transmission delay in multi-lane systems, the skew occurs between the lanes. When a transmission speed is relatively low, the skew between the lanes occurs within 8 bits. Accordingly, data reception is effectively performed by compensating for only the bit skew between the lanes. However, in high-speed data transmission devices such as the PCI Express bus, a difference of the transmission delay between the lanes may occur out of the 8-bit range. Accordingly, the high-speed data transmission devices such as the PCI Express bus require a byte skew compensation, as well as the bit skew compensation. The byte skew compensation deals with the byte skew between the received data through each of the lanes byte by byte.

Figure 1:
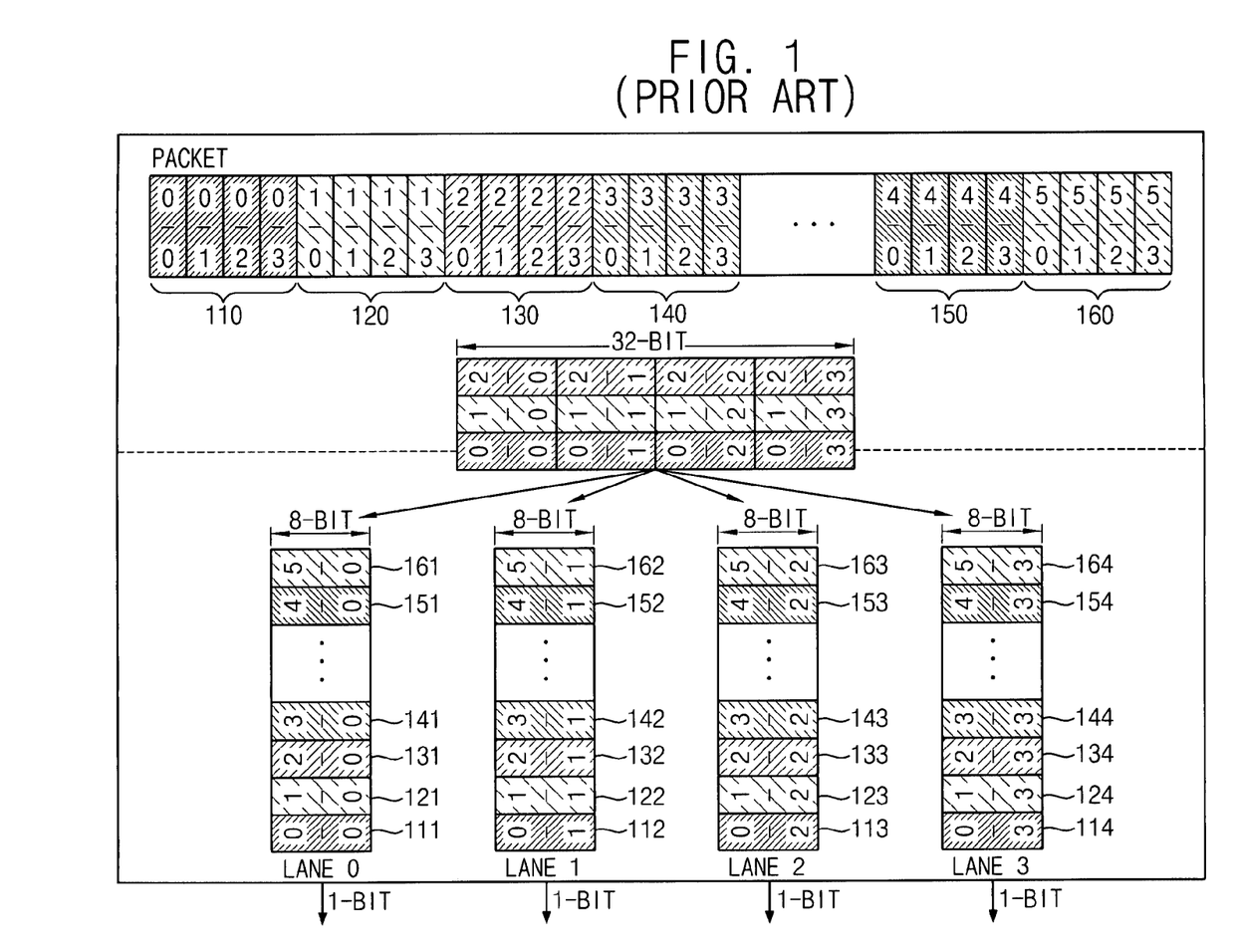
FIG. 1 is a block diagram illustrating a data transmission of a conventional PCI Express bus.

FIG. 1 is a block diagram illustrating a data transmission of a conventional PCI Express bus.

Referring to FIG. 1, the PCI Express bus transmits data using four lanes LANE 0 through LANE 3. A transmitter of the PCI Express bus divides 32-bit data 110 into four 8-bit data 111, 112, 113 and 114. Then, the transmitter transmits the four-data 111, 112, 113 and 114 through each of the lanes LANE 0, LANE 1, LANE 2 and LANE 3, respectively. Each of the four 8-bit data 111, 112, 113 and 114 is transmitted to a wire through an 8-bit/10-bit encoder (not shown) and a serializer (not shown) bit by bit. Other 32-bit data 120, 130, 140, 150 and 160 are respectively divided into four 8-bit data. Then, the divided four 8-bit data are transmitted through each of the lanes. Each of the lanes includes differential wires for transmission and reception, and thus, may include a total of 4 wires.

As shown in FIG. 1, when data are transmitted through each of the four lanes, each of the four lanes takes a different transmission delay from one another. Accordingly, the data transmitted from the transmitter are not simultaneously received by a PCI Express receiver. Therefore, the receiver should eliminate the skew between the received data through each of the four lanes.

Figure 2:
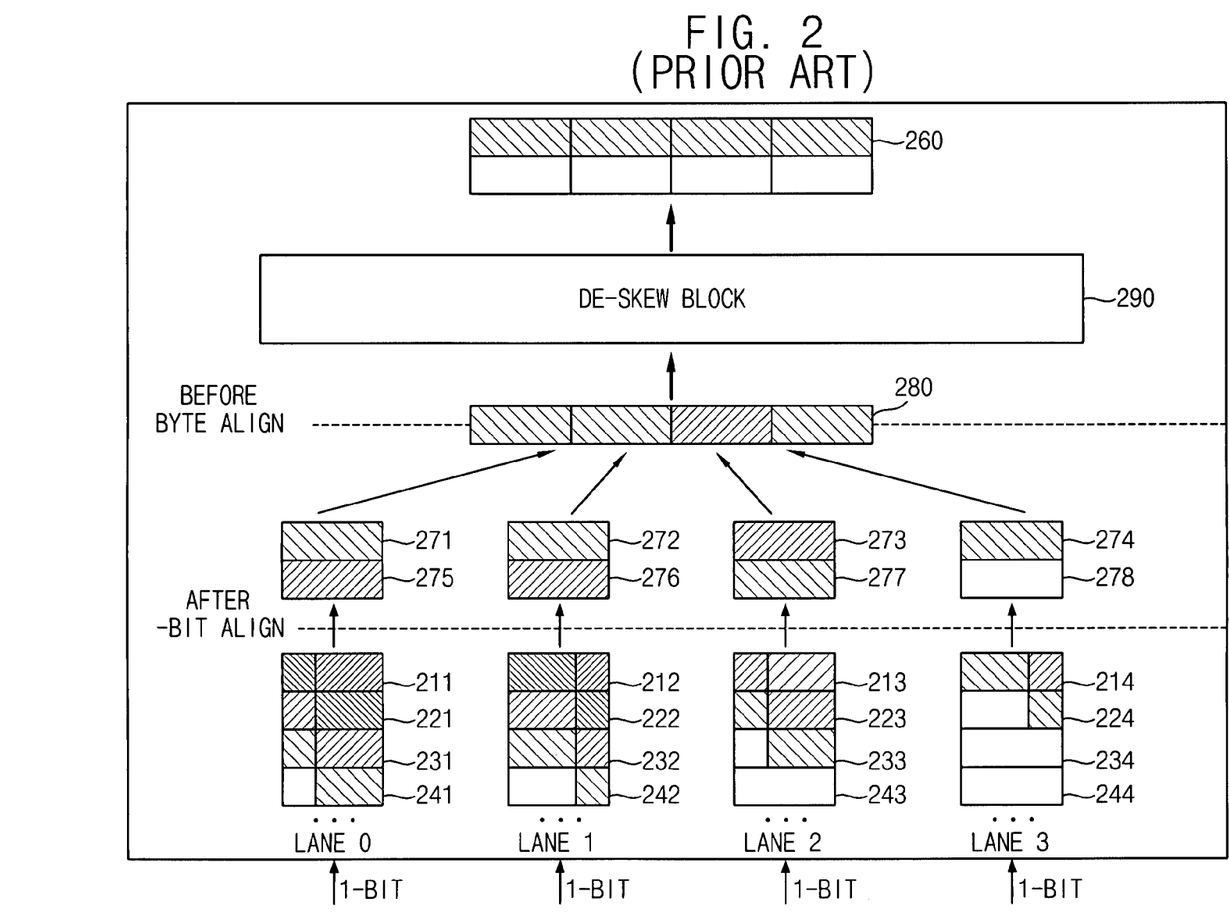
FIG. 2 is a block diagram illustrating a data reception of a conventional PCI Express bus.

FIG. 2 is a block diagram illustrating a data reception of a conventional PCI Express bus.

Referring to FIG. 2, the PCI Express receiver decodes bit data received through the wire using a de-serializer (not shown) to 8-bit data. As shown in FIG. 2, the bit skew and the byte skew occur between the lanes of the received 8-bit data 211, 212, 213, 214, 221, 222, 223, 224, 231, 232, 233, 234, 241, 242, 243 and 244. The reason for the bit skew and the byte skew occurring is that each of the lanes takes a differential transmission delay from one another. The PCI Express bus compensates for the bit skew between the received 8-bit data using a comma symbol to align the received 8-bit data and generates the aligned 8-bit data 271, 272, 273, 274, 275, 276, 277 and 278. The comma symbol may include a particular bit composition. The PCI Express bus generates 32-bit data 280 using the four 8-bit data 271, 272, 273 and 274. Each of the 8-bit data 271, 272, 273 and 274 included in the 32-bit data 280 does not include the bit skew, but the 32-bit data 280 includes the byte skew. Consequently, the PCI Express bus requires a de-skew block 290 capable of compensating for the byte skew between the received 32-bit data and capable of generating 32-bit data 260 having no byte skew.

The conventional de-skew block 290 shown in FIG. 2 compensates for the byte skew using the comma symbol. A conventional method of compensating for the byte skew includes a step of detecting the comma symbol included in the received data, a step of waiting until the comma symbols are detected in all of the lanes, and a step of aligning the received data by delaying the received data through other lanes based on a timing as to when the last comma symbol is detected. However, the conventional method of compensating for the byte skew using only the comma symbol may not appropriately compensate for the byte skew between the received data through each of the lanes, since skip symbols SKP are periodically transmitted after the comma symbol thereby varying each of the alignment points of the received data.

The PCI Express receiver includes an elastic buffer. The elastic buffer may remove the skip symbols included in the received data to prevent an overflow of the buffer when quantity of the received data through a certain lane is large. In addition, the elastic buffer may add the skip symbols to the received data to prevent an underflow of the buffer when quantity of the received data through a certain lane is small. When the addition or the removal of the skip symbol occurs, it is required that the byte skew compensation be performed by reflecting the addition or the removal of the skip symbol in an alignment process of the received data since the skip symbol is added or is removed to/from the received data after the comma symbol is received.

Figure 3:
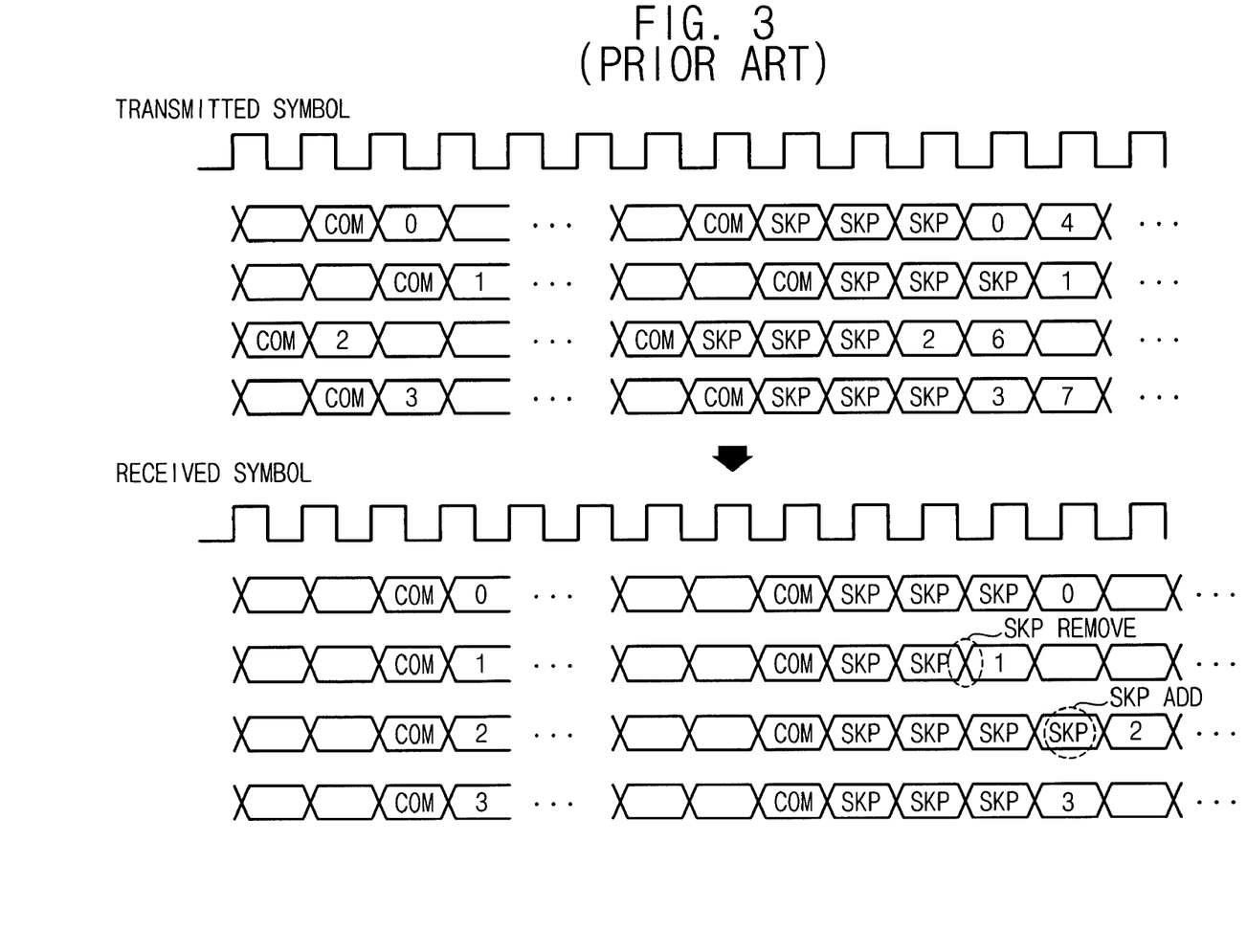
FIG. 3 is a timing diagram illustrating a conventional method of compensating for a byte skew using only comma symbol.

FIG. 3 is a timing diagram illustrating a conventional method of compensating for a byte skew using only comma symbol. Referring to FIG. 3, a comma symbol COM and three consecutive skip symbols SKPs are transmitted through respective lanes. According to a conventional method of compensating for a byte skew, the comma symbols COMs are synchronously arranged so that the data after the comma symbol COM may be received at the same time. There is no problem in the above method when the data of information to be transferred are received directly after the comma symbol. The skip symbol SKP is, however, received after the comma symbol COM, and the skip symbol SKP is added or removed through an elastic buffer. Therefore, the byte skew may not be compensated for, despite the arrangement based on the comma symbols COMs.

As a result, it is desired to have a method and device which can compensate for the byte skew regardless of an addition or a removal of the skip symbol.

SUMMARY OF THE INVENTION

Embodiments of the present invention provide methods of compensating for a byte skew of a PCI Express bus. These methods may appropriately compensate for the byte skew of the PCI Express bus by reflecting an addition or a removal of a skip symbol on a shift operation of an alignment point.

Embodiments of the present invention also provide a PCI Express physical layer receiver including a skew compensator. The skew compensator may appropriately compensate for the byte skew of the PCI Express bus by reflecting an addition or a removal of a skip symbol on a shift operation of an alignment point.

In some embodiments of the present invention, a method of compensating for a byte skew of PCI Express bus includes: determining whether or not received data are in a training sequence; setting an alignment point corresponding to each of the lanes based on a comma symbol included in the training sequence when the received data are in the training sequence; and shifting the alignment point by reflecting an addition or a removal of a skip symbol on the received data through each of the four lanes when the received data are not in the training sequence.

In further embodiments, the setting may include determining whether or not the lane where the comma symbol is detected exists; determining whether or not the comma symbols are detected in all of the lanes during a predetermined time period, when the lane where the comma symbol is detected exists; and setting each of the alignment points based on each of the timings when each of the comma symbols is detected, when the comma symbols are detected in all of the lanes during the predetermined time period.

In additional embodiments, the shifting may include determining whether or not the skip symbol is added to the received data corresponding to each of the lanes, or is removed from the received data corresponding to each of the lanes; shifting the alignment point of the corresponding received data so that the received data are less delayed when the skip symbol is added to the received data corresponding to each of the lanes; and shifting the alignment point of the corresponding received data so that the received data are more delayed when the skip symbol is removed from the received data corresponding to each of the lanes.

When the received data of the corresponding lane cannot be less delayed, each of the alignment points of the other lanes except for a corresponding lane may be shifted so that the received data corresponding to the other lanes are more delayed. In addition, when the received data of the corresponding lane cannot be more delayed, each of the alignment points of the other lanes except for a corresponding lane may be shifted so that the received data corresponding to the other lanes are less delayed.

In other embodiments of the present invention, a PCI Express physical layer receiver includes: a serializer/deserializer (SERDES) configured to convert serial data received through each of the lanes to parallel data of about 10 bits; a Physical Layer Device (PHY) Interface for the PCI Express Architecture (PIPE) configured to perform a bit alignment process on the 10-bit parallel data using the comma symbol, configured to convert the 10-bit parallel data to 8-bit parallel data, and configured to add the skip symbol to the received data or remove the skip symbol from the received data based on a status of the received data; and a skew compensator configured to set the alignment point of the 8-bit received data corresponding to each of the lanes based on the comma symbol included in a training sequence, and configured to compensate for the byte skew between the received data by shifting the alignment point of the received data corresponding to each of the lanes by reflecting an addition or a removal of the skip symbol. The serializer/deserializer may be a deserializer, and may convert serial data to parallel data. The training sequence may include TS1 and TS2 patterns of the PCI Express bus. The training sequence may be a test pattern of about 2.5 Gb/s. Several training sequences TS1 and TS2 may be received during an initialization process of the PCI Express bus.

In further embodiments, the comma symbol may be an 8-bit symbol having a predetermined bit composition used for compensating for the byte skew between the lanes. In an example embodiment of the present invention, the addition or the removal of the skip symbol may be performed in the PIPE of the PCI Express physical layer receiver, and the byte skew between the lanes may be effectively compensated for by reflecting the addition or the removal of the skip symbol on the shift operation of the alignment point. The number of the lanes of the PCI Express bus may be 4.

The skew compensator may compensate for the byte skew between the received data through the lanes based on the method of compensating for the byte skew of the PCI Express bus.

Consequently, the byte skew of the PCI Express bus may be effectively compensated for despite the addition or the removal of the skip symbol.

BRIEF DESCRIPTION OF THE DRAWINGS

The above and other features and advantages of the present invention will become more apparent when described in detailed example embodiments thereof with reference to the attached drawings in which.

DETAILED DESCRIPTION OF THE PREFERRED EMBODIMENTS

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Particularly, data may be transmitted in a form of a stream, so "data" may sometimes be understood as "a data stream" or "data streams".

Figure 4:
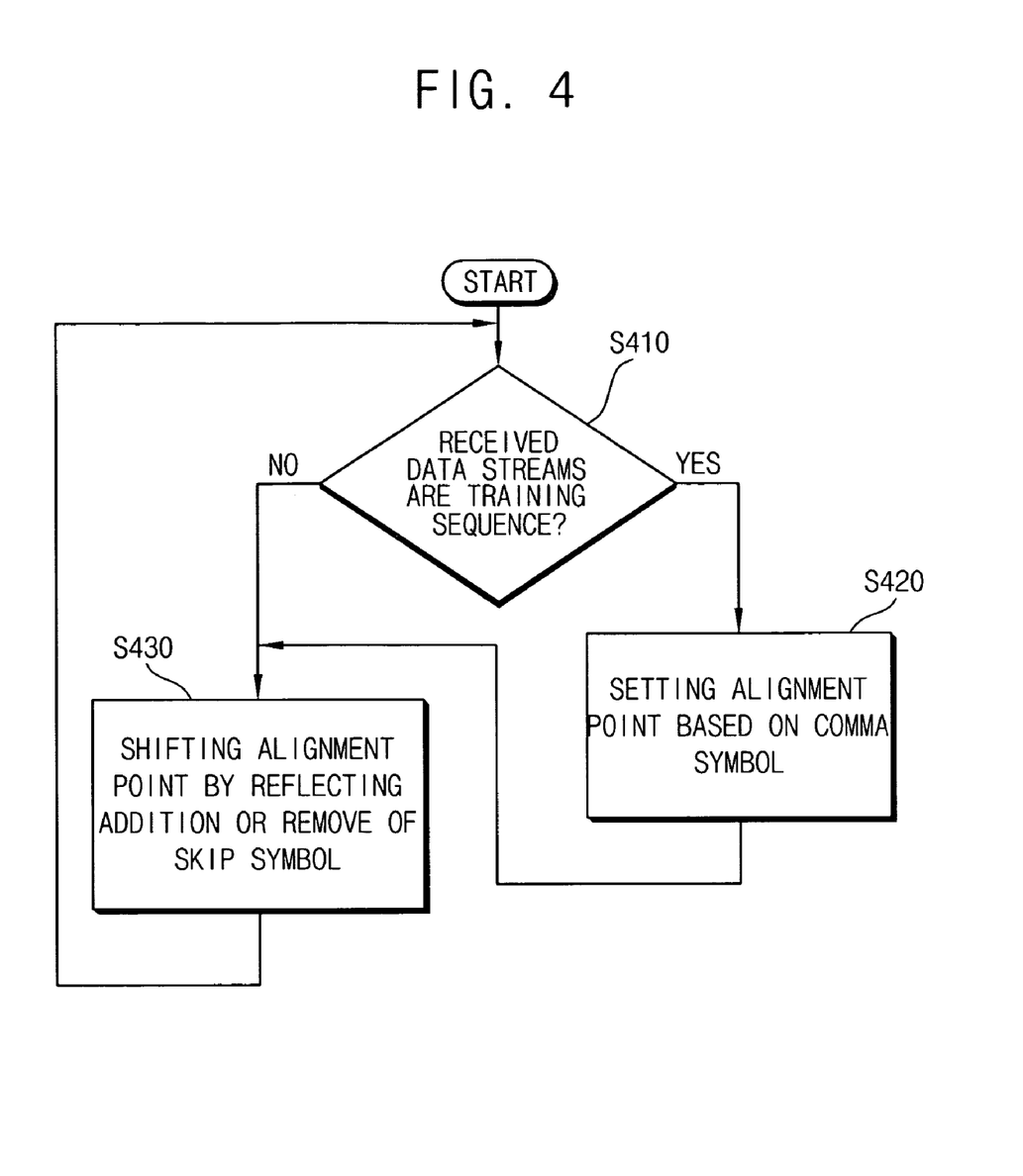
FIG. 4 is a flowchart illustrating a method of compensating for a byte skew of PCI Express bus according to an example embodiment of the present invention.

FIG. 4 is a flowchart illustrating a method of compensating for a byte skew of PCI Express bus according to an example embodiment of the present invention.

Referring to FIG. 4, the method includes a step S410 of determining whether or not received data are a training sequence.

The training sequence includes TS1 and TS2 patterns of the PCI Express bus. For example, the training sequence may be a test pattern having a clock frequency of about 2.5 Gb/s. Several training sequences TS1 or TS2 pattern may be received during an initialization process of the PCI Express bus.

When the received data are the training sequence, an alignment point corresponding to each of the lanes is set based on a comma symbol included in the training sequence at step S420.

The comma symbol may be an 8-bit symbol having a predetermined bit composition. The number of the lanes may be four.

The received data are stored in a register corresponding to each of the lanes. For example, the register may be a FIFO (First In, First Out) type shift register that is capable of storing the 8-bit data for 5 clocks.

A depth of the register may be defined as 5 when the shift register stores data for 5 clocks. When the byte skew between the lanes is a maximum of 4 clocks, the byte skew between the lanes may be sufficiently compensated for since the depth of the register is 5.

The alignment point may be a delay point of the shift register corresponding to each of the lanes. That is, when the shift register, whose depth is 5, is used for each of the lanes, the alignment point may correspond to the delay points 1 through 5.

The alignment point corresponding to the delay point 1 may be set corresponding to the latest stored data, and the alignment point corresponding to the delay point 5 is set corresponding to four-clocks delayed data on the latest stored data.

Figure 8A:
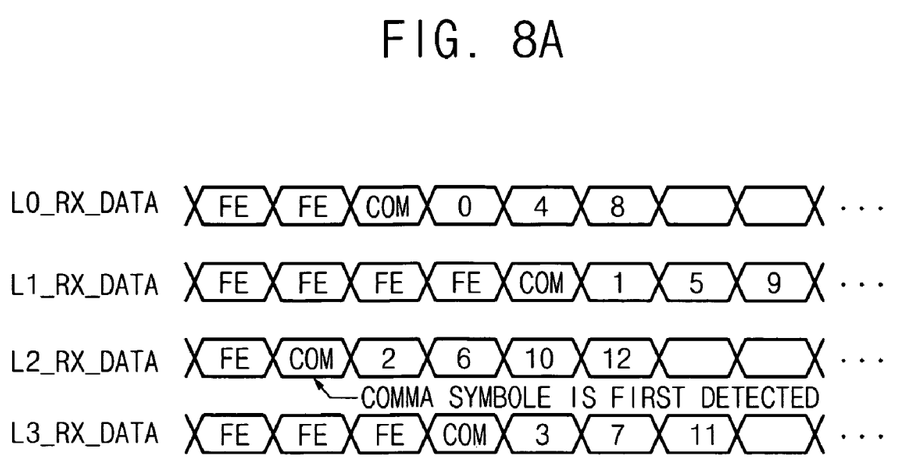
FIGS. 8A and 8B are timing diagrams illustrating an alignment point setting process according to an example embodiment of the present invention.
Figure 8B:
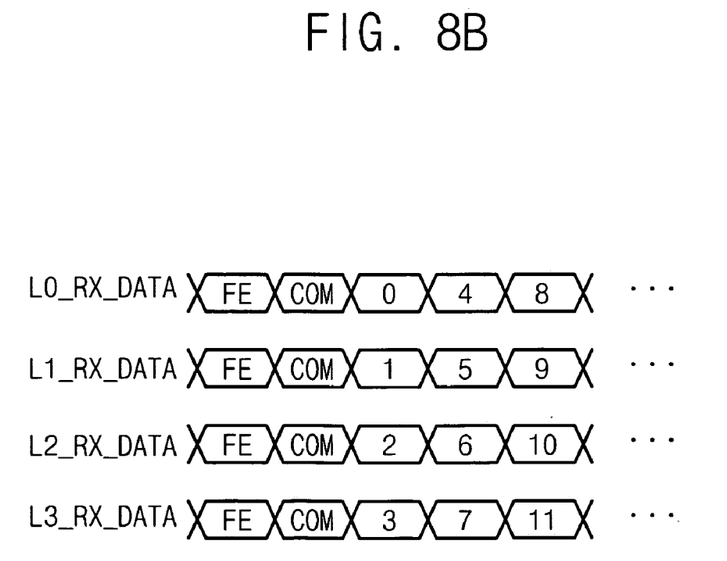

FIGS. 8A and 8B are timing diagrams illustrating an alignment point setting process according to an example embodiment of the present invention.

In FIGS. 8A and 8B, data symbols represented as FE, COM, 0, 1, 2, 3, 4, 5, 6, 7, 8, 9, 10, 11 and 12 may be 8-bit data symbols, respectively.

FIG. 8A is a timing diagram illustrating data received through four lanes before the alignment point setting process is performed.

Referring to FIG. 8A, a byte skew exists between data received through four lanes L0_RX_DATA, L1_RX_DATA, L2_RX_DATA and L3_RX_DATA before the alignment point setting process based on the comma symbol is performed.

Accordingly, the alignment point is to be set on each of the lanes, and the data received through each of the lanes are to be aligned based on the set alignment point.

FIG. 8B is a timing diagram illustrating received data aligned based on the set alignment point according to an example embodiment of the present invention.

Referring to FIG. 8B, it is shown that the data received through each of the lanes L0_RX_DATA, L1_RX_DATA, L2_RX_DATA and L3_RX_DATA are aligned based on the set comma symbol, respectively.

When the 8-bit register, whose depth is 5, is used for each of the lanes, a status of the register for each of the lanes corresponding to the timing diagram shown in FIG. 8A may be represented as Table 1 through Table 4.

TABLE 1

| | L0_RX_DATA REGISTER | | | | |
|---|---|---|---|---|---|
| | ST0 | ST1 | ST2 | ST3 | ST4 |
| t = N | FE | FE | FE | FE | FE |
| t = N + 1 | COM | FE | FE | FE | FE |
| t = N + 2 | 0 | COM | FE | FE | FE |
| t = N + 3 | 4 | 0 | COM | FE | FE |
| t = N + 4 | 8 | 4 | 0 | COM | FE |

TABLE 2

| | L1_RX_DATA REGISTER | | | | |
|---|---|---|---|---|---|
| | ST0 | ST1 | ST2 | ST3 | ST4 |
| t = N | FE | FE | FE | FE | FE |
| t = N + 1 | FE | FE | FE | FE | FE |
| t = N + 2 | FE | FE | FE | FE | FE |
| t = N + 3 | COM | FE | FE | FE | FE |
| t = N + 4 | 1 | COM | FE | FE | FE |

TABLE 3

| | L2_RX_DATA REGISTER | | | | |
|---|---|---|---|---|---|
| | ST0 | ST1 | ST2 | ST3 | ST4 |
| t = N | COM | FE | FE | FE | FE |
| t = N + 1 | 2 | COM | FE | FE | FE |
| t = N + 2 | 6 | 2 | COM | FE | FE |
| t = N + 3 | 10 | 6 | 2 | COM | FE |
| t = N + 4 | 12 | 10 | 6 | 2 | COM |

TABLE 4

| | L3_RX_DATA REGISTER | | | | |
|---|---|---|---|---|---|
| | ST0 | ST1 | ST2 | ST3 | ST4 |
| t = N | FE | FE | FE | FE | FE |
| t = N + 1 | FE | FE | FE | FE | FE |
| t = N + 2 | COM | FE | FE | FE | FE |
| t = N + 3 | 3 | COM | FE | FE | FE |
| t = N + 4 | 7 | 3 | COM | FE | FE |

Referring to Table 1 through Table 4, at time 't=N', the comma symbol COM is first detected in the data received through the lane L2_RX_DATA as shown in FIG. 8A.

Other times 't=N+1', 't=N+2', 't=N+3' and 't=N+4' denote one clock delayed timing of time 't=N', two-clocks delayed timing of time 't=N', three-clocks delayed timing of time 't=N' and four-clocks delayed timing of time 't=N', respectively.

As shown in Table 1 through Table 4, 'ST0', 'ST1', 'ST2', 'ST3' and 'ST4' denote a first stage, a second stage, a third stage, a fourth stage and a fifth stage of the shift register.

As shown in Table 1 through Table 4 and FIGS. 8A through 8B, 'COM' denotes the comma symbol, Arabic numerals denote a data symbol and 'FE' denotes a symbol transferred in advance of the comma symbol, and thus, is not a matter of concern.

Table 1 represents a status of the register L0_RX_DATA REGISTER corresponding to the lane L0_RX_DATA. The register L0_RX_DATA REGISTER corresponding to the lane L0_RX_DATA is a FIFO type shift register, and shifts input data at each clock to store the shifted input data.

The input data stored in the shift register at each clock are shifted from the stage ST0 to the stage ST4. Since the depth of the shift register is 5, the shift register may store the shifted input data for 5 clocks.

As shown in Table 1, the comma symbol COM of the data received through the lane L0_RX_DATA is stored in the shift register at time 't=N+1', one clock later than time 't=N', when the comma symbol is first stored in the shift register corresponding to the lane L2_RX_DATA.

The comma symbol COM of the data received through the lane L0_RX_DATA is shifted by 1 stage until time 't=N+4', four clocks later than time 't=N', when the comma symbol is first stored in the shift register corresponding to the lane L2_RX_DATA.

Table 2 represents the status of the register L1_RX_DATA REGISTER corresponding to the lane L1_RX_DATA. The register L1_RX_DATA REGISTER corresponding to the lane L1_RX_DATA is a FIFO type shift register, and shifts input data at each clock to store the shifted input data.

The input data stored in the shift register at each clock are shifted from the stage ST0 to the stage ST4. Since the depth of the shift register is 5, the shift register may store the shifted input data for 5 clocks.

As shown in Table 2, the comma symbol COM of the data received through the lane L1_RX_DATA is stored in the shift register at time 't=N+3', three clocks later than time 't=N', when the comma symbol is first stored in the shift register corresponding to the lane L2_RX_DATA.

The comma symbol COM of the data received through the lane L1_RX_DATA is shifted by 1 stage until time 't=N+4', four clocks later than time 't=N', when the comma symbol is first stored in the shift register corresponding to the lane L2_RX_DATA.

Table 3 represents the status of the register L2_RX_DATA REGISTER corresponding to the lane L2_RX_DATA. The register L2_RX_DATA REGISTER corresponding to the lane L2_RX_DATA is a FIFO type shift register, and shifts input data at each clock to store the shifted input data.

The input data stored in the shift register at each clock are shifted from the stage ST0 to the stage ST4. Because the depth of the shift register is 5, the shift register may store the shifted input data for 5 clocks.

As shown in Table 3, the comma symbol COM of the data received through the lane L2_RX_DATA is stored in the shift register at time 't=N'. The comma symbol COM of the data received through the lane L2_RX_DATA is shifted by 1 stage until time 't=N+4', four clocks later than time 't=N', when the comma symbol is first stored in the shift register corresponding to the lane L2_RX_DATA.

Table 4 represents the status of the register L3_RX_DATA REGISTER corresponding to the lane L3_RX_DATA. The register L3_RX_DATA REGISTER corresponding to the lane L3_RX_DATA is a FIFO type shift register, and shifts input data at each clock to store the shifted input data.

The input data stored in the shift register at each clock are shifted from the stage ST0 to the stage ST4. Because the depth of the shift register is 5, the shift register may store the shifted input data for 5 clocks.

As shown in Table 4, the comma symbol COM of the data received through the lane L3_RX_DATA is stored in the shift register at time 't=N+2', two clocks later than time 't=N', when the comma symbol is first stored in the shift register corresponding to the lane L2_RX_DATA.

The comma symbol COM of the data received through the lane L3_RX_DATA is shifted by 1 stage until time 't=N+4', four clocks later than time 't=N', when the comma symbol is first stored in the shift register corresponding to the lane L2_RX_DATA.

At time 't=N+3', when all of the comma symbols corresponding to each of the four lanes are stored in their corresponding shift register, the alignment point is set based on the stage of the shift register where the comma symbol is stored.

That is, in the shift register L0_RX_DATA REGISTER corresponding to the lane L0_RX_DATA shown in Table 1, and at time 't=N+3', when all of the comma symbols corresponding to each of the four lanes are stored in their corresponding shift register, the comma symbol may be shifted to the third stage ST2 from the first stage ST0 by two stages. Accordingly, for example, the alignment point of the lane L0_RX_DATA may be set as a binary value '00111'.

In the shift register L1_RX_DATA REGISTER corresponding to the lane L1_RX_DATA shown in Table 2, and at time 't=N+3', when all of the comma symbols corresponding to each of the four lanes are stored in their corresponding shift register, the comma symbol may be stored in the first stage ST0. Accordingly, for example, the alignment point of the lane L1_RX_DATA may be set as a binary value '00001'.

In the shift register L2_RX_DATA REGISTER corresponding to the lane L2_RX_DATA shown in Table 3, and at time 't=N+3', when all of the comma symbols corresponding to each of the four lanes are stored in their corresponding shift register, the comma symbol may be shifted to the fourth stage ST3 from the first stage ST0 by three stages. Accordingly, for example, the alignment point of the lane L2_RX_DATA may be set as a binary value '01111'.

In the shift register L3_RX_DATA REGISTER corresponding to the lane L3_RX_DATA shown in Table 4, and at time 't=N+3', when all of the comma symbols corresponding to each of the four lanes are stored in their corresponding shift register, the comma symbol may be shifted to the second stage ST1 from the first stage ST0 by one stage. Accordingly, for example, the alignment point of the lane L3_RX_DATA may be set as a binary value '00011'.

As a result, a transmission time of data, after the comma symbol, that are received by each of the four lanes may be synchronized by setting the alignment point of each of the four lanes based on the comma symbol.

In the timing diagram shown in FIG. 8A, when the data '0' received by the lane L0_RX_DATA are delayed by two clocks, the data '1' received by the lane L1_RX_DATA are not delayed, the data '2' received by the lane L2_RX_DATA are delayed by three clocks and the data '3' received by the lane L3_RX_DATA are delayed by one clock, all of the data received through each of the four lanes may be aligned based on the comma symbol as shown in the timing diagram of FIG. 8B.

Referring back to FIG. 4, when the received data are not in the training sequence, the alignment point is shifted by reflecting an addition or a removal of the skip symbol on the data received through each of the four lanes at step S430.

When the PCI Express transmitter transmits the skip symbols with data symbols, the PCI Express receiver may add the skip symbols to the received data or may remove the skip symbols from the received data so as to prevent an overflow or underflow of an elastic buffer included in the PCI Express receiver.

Since the skip symbol is received after the comma symbol is received, in order to correctly compensate for the byte skew between the data received through each of the four lanes, the alignment process reflecting the addition or the removal of the skip symbol on a shift operation of the alignment point should be selectively performed as well as the alignment process using the comma symbol.

Figure 9:
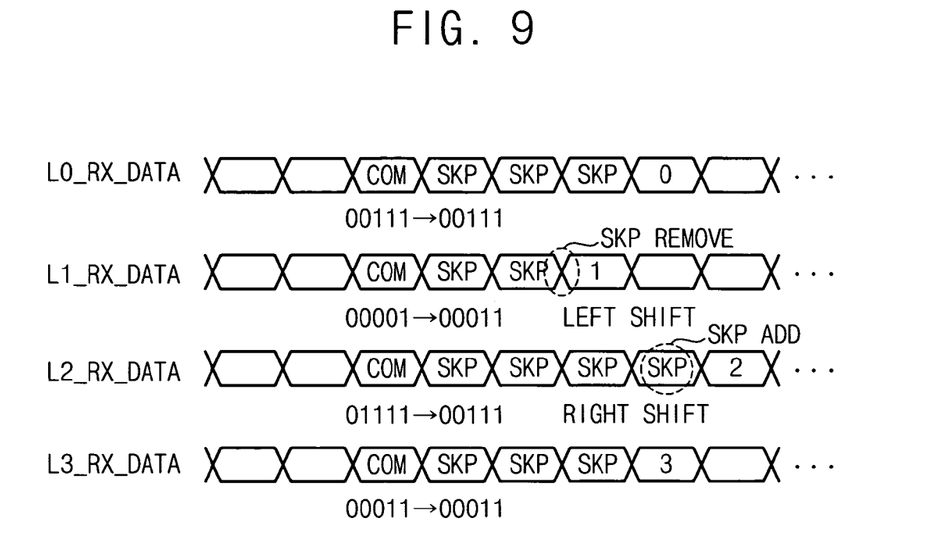
FIG. 9 is a timing diagram illustrating an alignment point shift process according to an example embodiment of the present invention.

FIG. 9 is a timing diagram illustrating an alignment point shift process according to an example embodiment of the present invention.

Referring to FIG. 9, after the alignment process based on the comma symbol is performed, the skip symbol is removed from the data received through the lane L1_RX_DATA, and the skip symbol is added to the data received through the lane L2_RX_DATA.

Despite the alignment process based on the comma symbol, the byte skew occurs between the data received through each of the four lanes L0_RX_DATA, L1_RX_DATA, L2_RX_DATA and L3_RX_DATA due to the addition or the removal of the skip symbol. Accordingly, in order to align the data received through each of the four lanes, each of the alignment points is to be shifted, respectively.

That is, when the skip symbol is added to the received data, the corresponding alignment point is adjusted so that the received data are less delayed, and when the skip symbol is removed from the received data, the corresponding alignment point is adjusted so that the received data are more delayed.

Based on the comma symbol as shown in FIG. 9, when the alignment point of the lane L0_RX_DATA is set as the binary value '00111', the alignment point of the lane L1_RX_DATA is set as the binary value '00001', the alignment point of the lane L2_RX_DATA is set as the binary value '01111' and the alignment point of the lane L3_RX_DATA is set as the binary value '00011', the alignment point of the lane L1_RX_DATA is shifted from the binary value '00001' to '00011', and the alignment point of the lane L2_RX_DATA is shifted from the binary value '01111' to '00111' since the skip symbol is removed from the data received through the lane L1_RX_DATA, and the skip symbol is added to the data received through the lane L2_RX_DATA.

The reason why the alignment point of the lane L1_RX_DATA is shifted from the binary value '00001' to '00011' is for more delaying the data received through the lane L1_RX_DATA.

The reason why the alignment point of the lane L2_RX_DATA is shifted from the binary value '01111' to '00111' is for less delaying the data received through the lane L2_RX_DATA.

Each of the alignment points varied due to the addition or removal of the skip symbol may be adjusted as described above. Consequently, the byte skew between the data received through each of the four lanes may be effectively compensated for by selectively aligning the data received through each of the four lanes.

Figure 5:
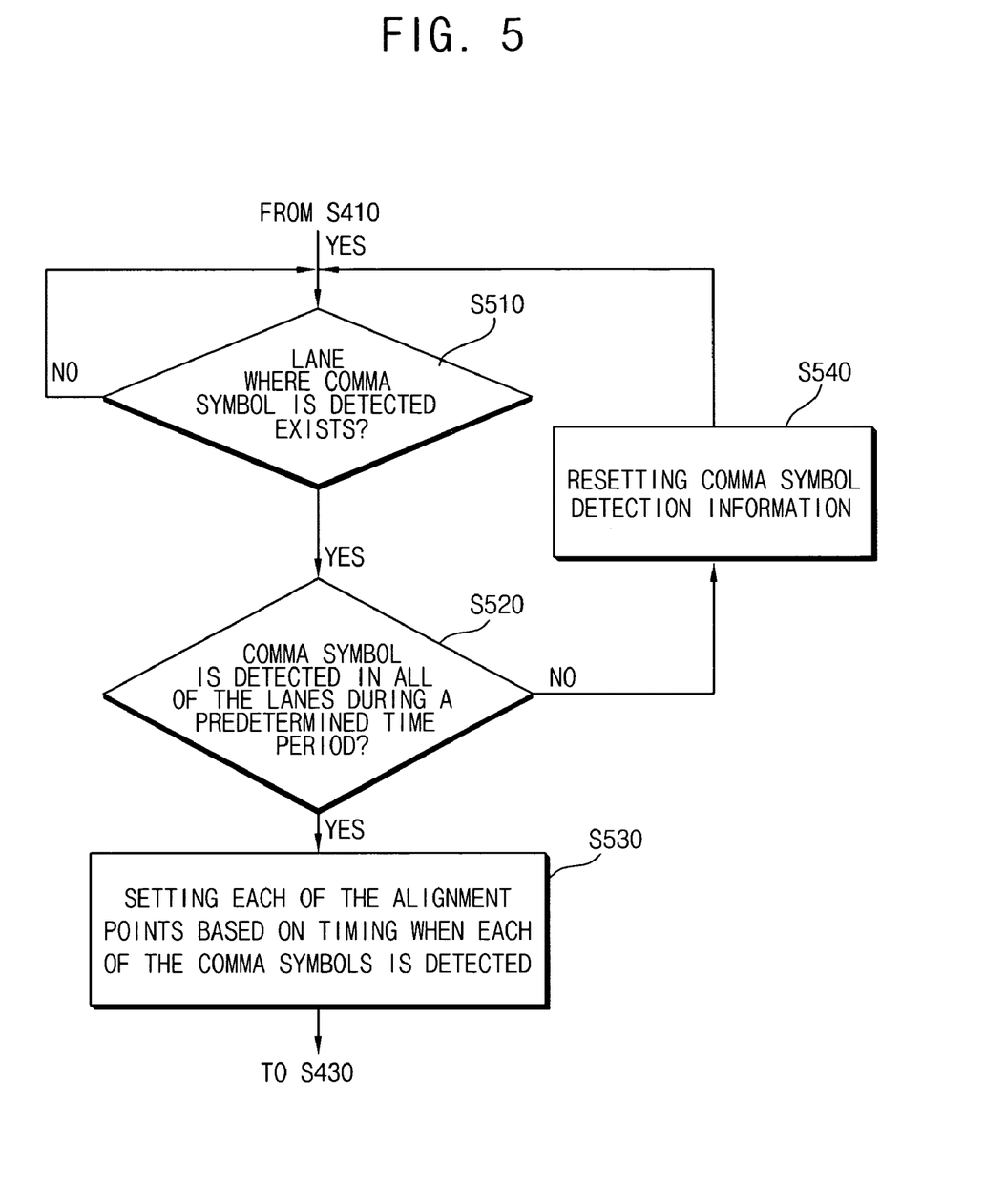
FIG. 5 is a flowchart illustrating an example embodiment of a step S420 shown in FIG. 4.

FIG. 5 is a flowchart illustrating an example embodiment of step S420 shown in FIG. 4.

Referring to FIG. 5, the step S420 shown in FIG. 4 includes step 510 of determining whether or not the lane where the comma symbol is detected exists.

A training sequence, such as the TS1 and TS2 patterns of the PCI Express bus, carries the comma symbol at a predetermined interval. Accordingly, in step S510, it is determined whether or not the lane where the comma symbol included in the training sequence is detected exists.

When the lane where the comma symbol included in the training sequence is detected exists, it is determined at step S520 whether or not the comma symbols are detected in all of the lanes during a predetermined time period.

The predetermined time period is associated with the depth of the register corresponding to each of the lanes. That is, when the depth of the register is 5, it is determined whether the comma symbols are detected in all of the lanes within 5 clocks. The reason for determining whether or not the comma symbols are detected in all of the lanes within the 5 clocks when the depth of the register is 5, is that when the 5 clocks have elapsed, the register, where the comma symbol is first detected, no longer stores the comma symbol.

When the comma symbols are detected in all of the lanes during the predetermined time period, each of the alignment points is set at step S530 based on each of the timings when each of the comma symbols is detected.

The alignment point may be a delay point of the shift register corresponding to each of the lanes. That is, when the shift register having the depth of 5 is used for each of the lanes, the alignment point may correspond to delay points 1 through 5.

The alignment point corresponding to the delay point 1 corresponds to the latest stored data, and the alignment point corresponding to the delay point 5 corresponds to the four-clocks delayed data on the latest stored data.

When the comma symbols are not detected in all of the lanes during the predetermined time period, comma symbol detection information is reset at step S540.

The comma symbol detection information may contain information on the lanes where the comma symbol has been detected previously.

When the comma symbols are not detected in all of the lanes during the predetermined time period, a comma symbol detection process on all of the lanes is re-started.

Accordingly, the comma symbol detection information containing the information on the lanes where the comma symbol has been detected previously is reset and the comma symbol detection process may be newly performed.

The comma symbol detection information includes all of the information required for determining whether or not the comma symbols are detected in all of the lanes. For example, the comma symbol detection information may include information on which stage of the register that corresponds to the lane is where the comma symbol is stored. After the comma symbol detection information is reset, the process flow of step S420 returns to step S510.

Figure 6:
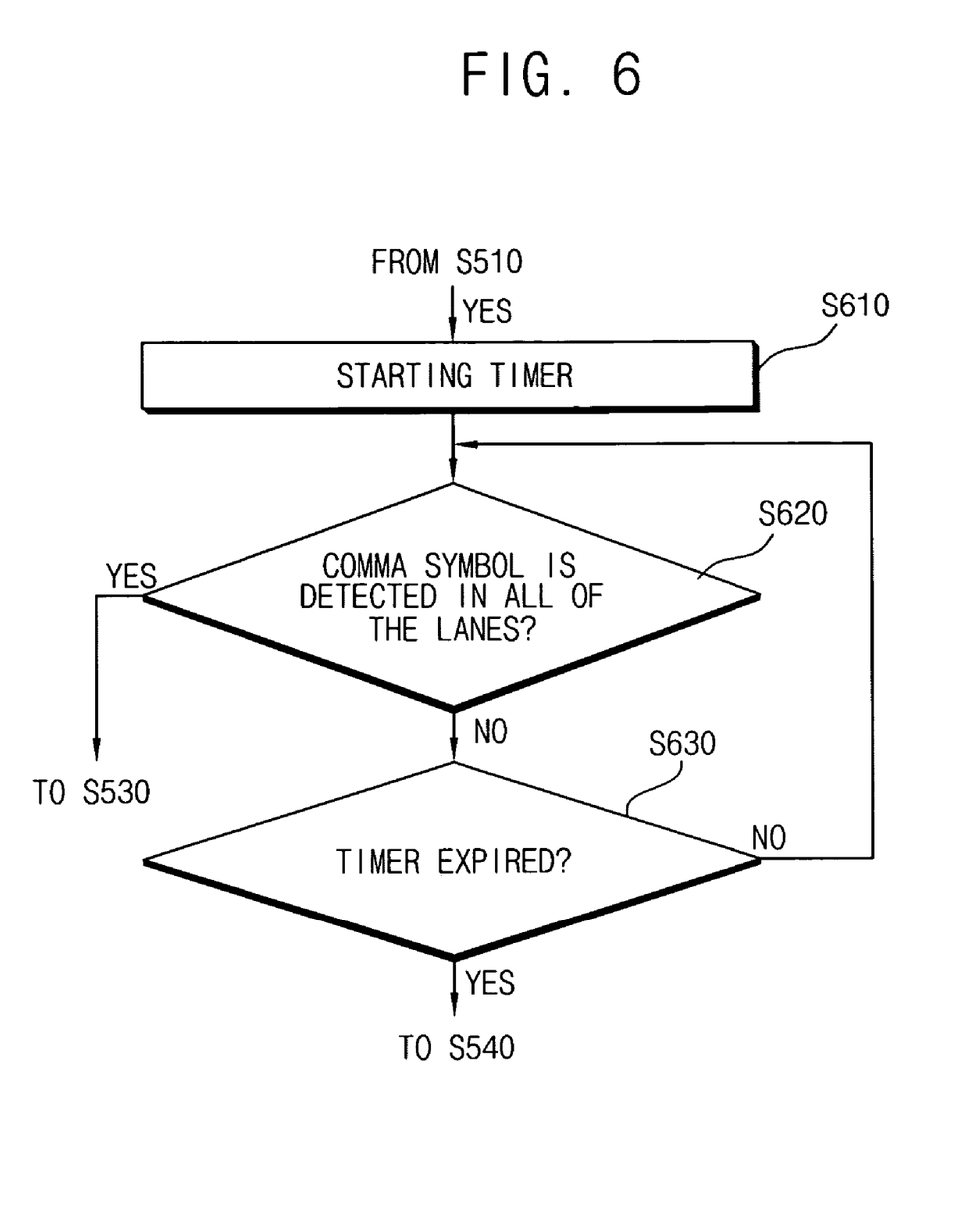
FIG. 6 is a flowchart illustrating an example embodiment of a step S520 shown in FIG. 5.

FIG. 6 is a flowchart illustrating an example embodiment of step S520 shown in FIG. 5.

Referring to FIG. 6, step S520 includes step S610 of starting a timer when the lane where the comma symbol is received exists. The timer is for measuring a time period associated with the depth of the register corresponding to each of the lanes.

When the depth of the register is 5, it is determined whether or not the comma symbols are detected in all of the lanes within the 5 clocks. The reason for determining within the 5 clocks whether or not the comma symbols are detected in all of the lanes when the depth of the register is 5, is that when the 5 clocks have elapsed, the register, where the first comma symbol is detected, no longer stores the comma symbol. Accordingly, the timer may measure a time period corresponding to the 5 clocks.

Then, it is determined at step S620 whether or not the comma symbols are detected in all of the lanes. Step 520 also includes step S630 of determining whether or not the timer is expired.

Step S620 and step S630 may be performed in the order shown in FIG. 6, or may be performed in reverse order from that shown in FIG. 6, or may be performed at the same time.

Before the timer is expired, when the comma symbol is received by all of the lanes, the process flow returns to step S530 shown in FIG. 5, and then, each of the alignment points is set based on each of the timings when each of the comma symbols is detected.

When the comma symbol is not received by all of the lanes and the timer is not expired, the process flow returns to step S620 and then, it is determined whether or not the comma symbol is received by all of the lanes.

When the comma symbol is not received by all of the lanes and the timer is expired, the process flow returns to step S540 shown in FIG. 5 and then, the comma symbol detection information is reset.

Figure 7:
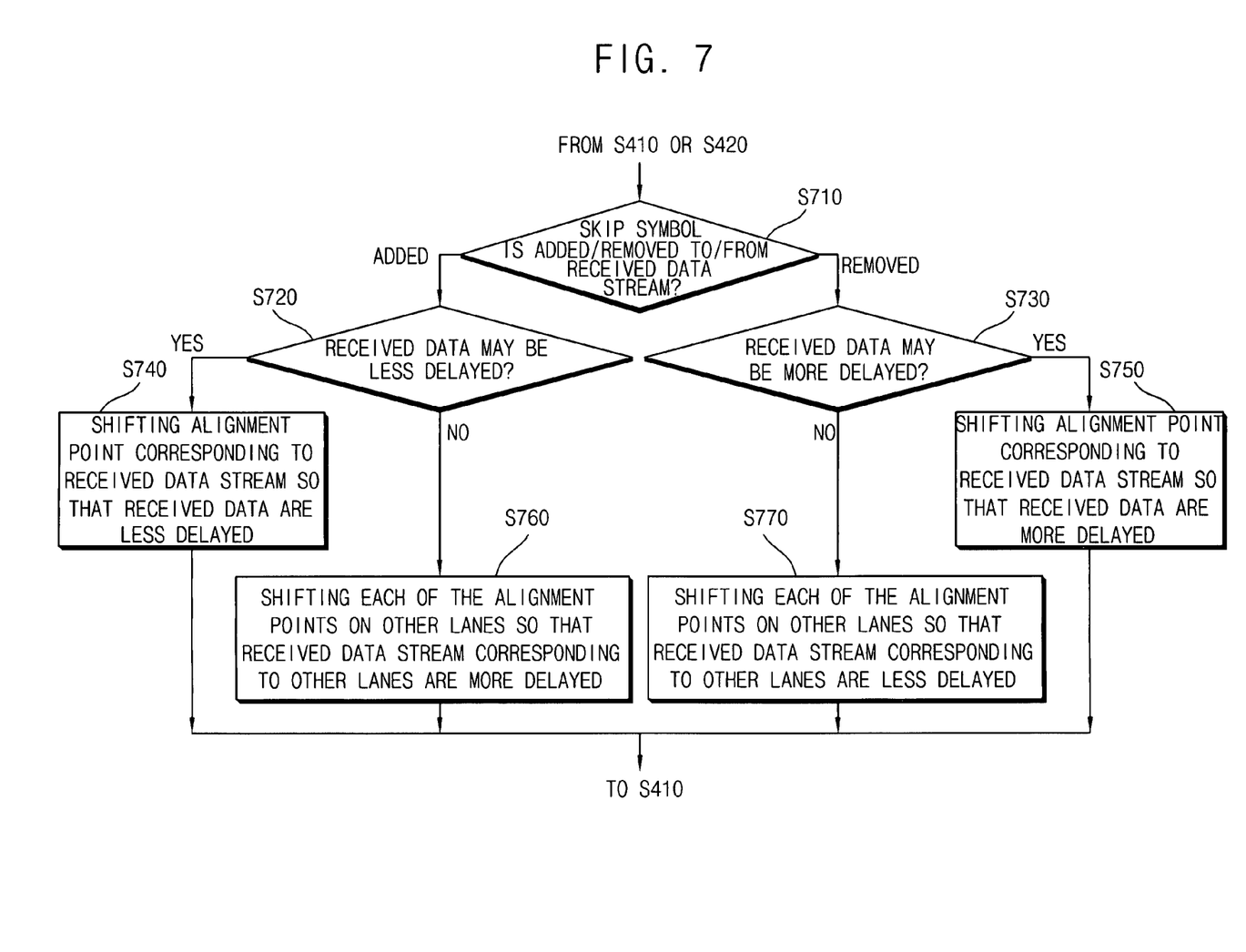
FIG. 7 is a flowchart illustrating an example embodiment of a step S430 shown in FIG. 4.

FIG. 7 is a flowchart illustrating an example embodiment of step S430 shown in FIG. 4.

Referring to FIG. 7, step S430 shown in FIG. 4 includes step S710 of determining whether or not the skip symbol is added to the received data or is removed from the received data.

It may be determined whether the skip symbol is added to or is removed from the received data using information on the addition or the removal of the skip symbol provided from a PHY Interface for the PCI Express Architecture (PIPE) of the PCI Express bus.

When the skip symbol is added to the received data, it is determined at step S720 whether or not the alignment point of the corresponding received data may be shifted so that the corresponding received data are less delayed.

The reason for determining whether or not the alignment point of the corresponding received data may be shifted is that there may exist a case in which the alignment point of the corresponding received data may not be shifted, so that the corresponding received data are less delayed when the skip symbol is added to the received data as described in Table 2.

When the received data may be less delayed, the alignment point of the corresponding received data is shifted at step S740 so that the received data are less delayed.

For example, as described in FIG. 9, when the skip symbol is added to the received data, the alignment point is shifted from the binary value '01111' to '00111'.

When the received data cannot be less delayed, each of the alignment points of other lanes is shifted at step S760 so that the received data corresponding to the other lanes are more delayed.

That is, in case the lane where the received data cannot be less delayed exists, each of the alignment points may be appropriately adjusted by considering whether or not other lanes, except for the lane where the received data cannot be less delayed, receive the data to which the skip symbol is added or from which the skip symbol is removed.

The depth of the shift register corresponding to each of the lanes should be suitably set, so that a condition, in which a shift operation of the alignment point is impossible, cannot occur.

When the skip symbol is removed from the received data, it is determined at step S730 whether or not the alignment point of the corresponding received data may be shifted so that the corresponding received data are more delayed.

The reason for determining whether or not the alignment point of the corresponding received data may be shifted is that there may exist a case in which the alignment point of the corresponding received data cannot be shifted, so that the corresponding received data are more delayed when the alignment point has the binary value such as '11111' even though the skip symbol has been removed from the received data.

When the received data may be more delayed, the alignment point of the corresponding received data is shifted at step S750 so that the received data are more delayed.

For example, as described in FIG. 9, when the skip symbol is removed from the received data, the alignment point is shifted from the binary value '00001' to '00011'.

When the received data cannot be more delayed, each of the alignment points of other lanes is shifted at step S770 so that the received data corresponding to the other lanes are less delayed.

That is, in case the lane where the received data cannot be more delayed exists, each of the alignment points may be appropriately adjusted by considering whether or not other lanes, except for the lane where the received data may not be more delayed, receive the data to which the skip symbol is added or from which the skip symbol is removed.

The depth of the shift register corresponding to each of the lanes should be suitably set, so that a condition, in which a shift operation of the alignment point is impossible, cannot occur.

Figure 10:
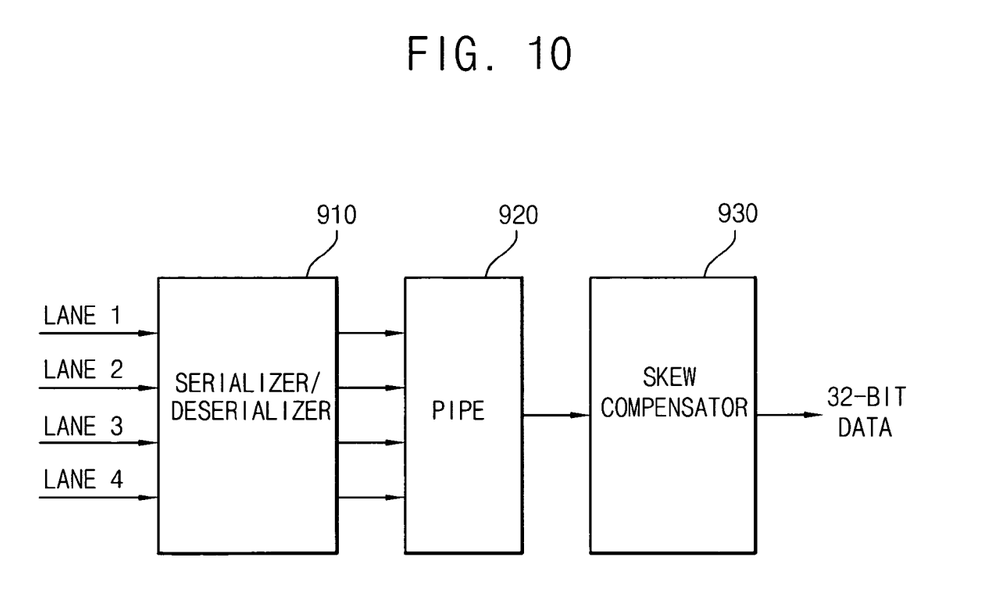
FIG. 10 is a block diagram illustrating a PCI Express physical layer receiver according to an example embodiment of the present invention.

FIG. 10 is a block diagram illustrating a PCI Express physical layer receiver according to an example embodiment of the present invention.

Referring to FIG. 10, the PCI Express physical layer receiver includes a serializer/deserializer 910, a PHY Interface for the PCI Express Architecture (PIPE) 920, and a skew compensator 930.

The SERDES 910 converts serial data received through each of the lanes to 10 bits of parallel data. The serializer/deserializer 910 may be a deserializer.

The PIPE 920 performs a bit alignment process on the 10-bit parallel data using the comma symbol, converts the 10-bit parallel data to 8-bit parallel data, and adds the skip symbol to the received data or removes the skip symbol from the received data based on a status of the received data.

The PIPE 920 may include an elastic buffer, may remove the skip symbol from the received data so as to prevent an overflow of the elastic buffer, and may add the skip symbol to the received data so as to prevent an underflow of the elastic buffer.

The PIPE 920 may be defined by the PIPE specification of Intel Corporation. The PIPE specification of Intel Corporation is designed for developing a functionally equivalent PCI Express physical layer.

The skew compensator 930 sets the alignment point of the received data corresponding to each of the lanes based on the comma symbol included in the training sequence, and compensates for the byte skew between the received data by shifting the alignment point of the received data corresponding to each of the lanes according to an addition or a removal of the skip symbol. The skew compensator 930 may receive information on the addition or the removal of the skip symbol from the PIPE 920.

The training sequence includes TS1 and TS2 patterns of the PCI Express bus. For example, the training sequence may be a test pattern having a clock frequency of about 2.5 Gb/s. Several training sequences such as the TS1 and/or TS2 patterns may be received during an initialization process of the PCI Express bus. The comma symbol may be an 8-bit symbol having a predetermined bit composition, which is used for compensating for the byte skew between the lanes. For example, the number of the lanes may be 4.

The skew compensator 930 compensates for the byte skew between the received data through each of the lanes based on the method of compensating for the byte skew of the PCI Express bus as described in FIGS. 4 through 7.

The skew compensator 930 may be implemented by programming a micro controller so that the method described in FIGS. 4 through 7 is performed.

The skew compensator 930 may be implemented by coding in VHDL (Very High Speed Integrated Circuit Hardware Description Language) and performing a synthesis process.

As described above, the method of compensating for the byte skew between the received data corresponding to each of the lanes and the PCI Express physical layer receiver set the alignment point of the received data corresponding to each of the lanes using the comma symbol included in the training sequence, and reflect the addition or removal of the skip symbol on the shift operation of the alignment point.

Therefore, the method and the PCI Express physical layer receiver may effectively compensate for the byte skew between the received data corresponding to each of the lanes.

Further, the PCI Express receiver may quickly and correctly recover the received data.

While the example embodiments of the present invention and their advantages have been described in detail, it should be understood that various changes, substitutions and alterations may be made herein without departing from the scope of the invention.

What is claimed is:

1. A method of compensating for a byte skew of a PCI Express bus, the method comprising:
   determining whether or not a plurality of data streams are in a training sequence, each of the plurality of data streams being received through a respective lane;
   setting an alignment point for each respective lane based on a comma symbol included in the corresponding data stream received through the respective lane, when the received data streams are in the training sequence; and
   shifting an alignment point by adding or removing a skip symbol in the corresponding data stream, when the received data streams are not in the training sequence, wherein shifting an alignment point comprises:
   determining whether or not the skip symbol is added into the corresponding received data stream for each of the lanes, or whether or not the skip symbol is removed from the corresponding received data stream for each of the lanes;

shifting each of the alignment points so that the corresponding received data stream is less delayed by shifting the alignment points of the other lanes except for the corresponding lane wherein the other received data streams except for the corresponding received data stream are more delayed when the corresponding received data stream cannot be less delayed, when the skip symbol is added into the corresponding received data stream; and shifting each of the alignment points so that the corresponding received data stream is more delayed by shifting the alignment points of the other lanes except for the corresponding lane wherein the other received data streams except for the corresponding received data stream are less delayed when the corresponding received data stream cannot be more delayed, when the skip symbol is removed from the corresponding received data stream.

2. The method of claim 1, wherein a number of the lanes is four.

3. The method of claim 1, wherein setting an alignment point comprises:

determining whether or not there exists a lane where the comma symbol is detected;

determining whether or not comma symbols are detected in all of the lanes during a predetermined time period, when there exists a lane where the comma symbol is detected; and setting each of the alignment points based on each of timings when the corresponding comma symbol is detected, when the comma symbols are detected in all of the lanes during the predetermined time period.

4. The method of claim 3, wherein determining whether or not the comma symbols are detected in all of the lanes during the predetermined time period, comprises:

starting a timer when there exists the lane where the comma symbol is detected;

determining whether or not the comma symbols are detected in all of the lanes; and determining whether or not the timer is expired.

5. A PCI Express physical layer receiver comprising:

a deserializer configured to convert each of a plurality of serial data streams received through respective lanes to respective 10-bit parallel data streams;

a PHY Interface for the PCI Express Architecture (PIPE) configured to perform a bit alignment process on each of the 10-bit parallel data streams based on comma symbols, configured to convert each of the 10-bit parallel data streams to respective 8-bit parallel data streams, and configured to add a skip symbol to the 8-bit parallel data stream or remove a skip symbol from the 8-bit parallel data stream based on a status of the corresponding received data stream; and a skew compensator configured to set alignment points corresponding to each of the lanes based on a corresponding comma symbol included in the corresponding 8-bit parallel data stream, and configured to compensate for a byte skew between the 8-bit parallel data streams by shifting each of the alignment points based on the addition or removal of the skip symbol in the corresponding 8-bit parallel data stream, wherein the skew compensator is configured to shift each of the alignment points so that the corresponding 8-bit parallel data stream is less delayed when the skip symbol is added into the corresponding 8-bit parallel data stream, and configured to shift the alignment points so that the corresponding 8-bit parallel data stream is more delayed when the skip symbol is removed from the corresponding 8-bit parallel data stream.

6. The PCI Express physical layer receiver of claim 5, wherein a number of the lanes is four.

7. The PCI Express physical layer receiver of claim 5, wherein the skew compensator receives information on the addition or the removal of the skip symbol from the PIPE.

8. The PCI Express physical layer receiver of claim 5, wherein the skew compensator is configured to determine whether or not there exists the lane where the corresponding comma symbol is detected, configured to determine whether or not the comma symbols are detected in all of the lanes during a predetermined time period, when there exists the lane where the comma symbol is detected, and configured to set each of the alignment points based on each of timings when the corresponding comma symbols is detected, when the comma symbols are detected in all of the lanes during the predetermined time period.

9. The PCI Express physical layer receiver of claim 8, wherein the skew compensator comprises a timer for determining whether or not the comma symbols are detected in all of the lanes during the predetermined time period.

10. The PCI Express physical layer receiver of claim 9, wherein the timer is configured to be started when there exists the lane where the corresponding comma symbol is detected, and configured to be reset when the comma symbols are not detected in all of the lanes during the predetermined time period.

11. The PCI Express physical layer receiver of claim 5, wherein the skew compensator is configured to shift the alignment points of the other lanes except for the corresponding lane wherein the other 8-bit parallel data stream except for the corresponding 8-bit parallel data stream are more delayed when the corresponding 8-bit parallel data stream cannot be less delayed.

12. The PCI Express physical layer receiver of claim 5, wherein the skew compensator is configured to shift the alignment points of the other lanes except for the corresponding lane wherein the other 8-bit parallel data streams except for the corresponding data stream are less delayed when the corresponding 8-bit parallel data stream cannot be more delayed.

13. A method of compensating for a byte skew of a PCI Express bus, the method comprising:

determining whether or not a plurality of data streams are in a training sequence, each of the plurality of data streams being received through a respective lane;

when the received data streams are in the training sequence, setting an alignment point for each lane based on a comma symbol included in the corresponding data stream received through the corresponding lane, wherein setting an alignment point comprises determining whether or not there exists a lane where the comma symbol is detected;

setting each of the alignment points based on each of timings when the corresponding comma symbol is detected; and when the received data streams are not in the training sequence, shifting an alignment point by adding or removing a skip symbol in the corresponding data stream, wherein shifting each of the alignment points comprises:

determining whether or not the skip symbol is added into the corresponding received data stream for each of the lanes, or whether or not the skip symbol is removed from the corresponding received data stream for each of the lanes; and when the skip symbol is added into the corresponding received data stream, shifting each of the alignment points of the other lanes except for the corresponding lane wherein the other received data streams except for the corresponding received data stream are more delayed when the corresponding received data stream cannot be less delayed.

14. The method of claim 13, wherein when the skip symbol is removed from the corresponding received data stream, shifting each of the alignment points of the other lanes except for the corresponding lane wherein the other received data streams except for the corresponding received data stream are less delayed when the corresponding received data stream cannot be more delayed.

15. The method of claim 13, further comprising, when there exists a lane where the comma symbol is detected, determining whether or not comma symbols are detected in all of the lanes during a predetermined time period, wherein determining whether or not the comma symbols are detected in all of the lanes during the predetermined time period comprises:

starting a timer when there exists the lane where the comma symbol is detected;

determining whether or not the comma symbols are detected in all of the lanes;

determining whether or not the timer is expired; and setting each of the alignment points based on each of timings when the comma symbols are detected in all of the lanes during the predetermined time period.

* * * * *